(12) United States Patent
Slatter

(10) Patent No.: US 7,228,655 B2
(45) Date of Patent: Jun. 12, 2007

(54) REVOLVING LOCK ROD STORAGE HOLDER

(76) Inventor: Stephen O. Slatter, 8631 NW. 21st Ct., Sunrise, FL (US) 33322

( * ) Notice: Subject to any disclaimer, the term of this patent is extended or adjusted under 35 U.S.C. 154(b) by 242 days.

(21) Appl. No.: 10/852,055

(22) Filed: May 24, 2004

(65) Prior Publication Data

US 2005/0000144 A1   Jan. 6, 2005

Related U.S. Application Data

(60) Provisional application No. 60/473,839, filed on May 27, 2003.

(51) Int. Cl.
*A01K 97/10* (2006.01)
(52) U.S. Cl. ...................................... 43/21.2
(58) Field of Classification Search .................. 43/21.2
See application file for complete search history.

(56) References Cited

U.S. PATENT DOCUMENTS 572,770 A * 12/1896 Putnam ....................... 211/19
3,564,751 A * 2/1971 Holiman ....................... 43/21.2
4,132,381 A * 1/1979 McClellan ................ 248/316.1
4,897,952 A * 2/1990 Hawie ......................... 43/21.2
6,370,810 B1 * 4/2002 Widerman .................. 43/21.2
6,561,471 B1 * 5/2003 Hawie ......................... 248/201

* cited by examiner

*Primary Examiner*—Peter M. Poon
*Assistant Examiner*—Bethany L. Griles
(74) *Attorney, Agent, or Firm*—Robert M. Schwartz; Alfred K. Dassler

(57) ABSTRACT

A revolving lock rod storage holder is disclosed including a revolving lock having a first spring cavity and a first spring anchor member, a revolving lock body operatively engaged to the revolving lock, the revolving lock body having a second spring cavity and a second spring anchor member, and a spring operatively engaged to the first spring anchor member and the second spring anchor member, at least a portion of the spring positioned in the first spring cavity and the second spring cavity.

9 Claims, 5 Drawing Sheets

REVOLVING LOCK ROD STORAGE HOLDER

CROSS-REFERENCE TO RELATED APPLICATION

This application claims the benefit of U.S. Provisional Application Ser. No. 60/473,839, filed on May 27, 2003, entitled REVOLVING LOCK ROD STORAGE HOLDER.

TECHNICAL FIELD OF THE INVENTION

The present invention relates to the field of sport fishing, and particularly to a fishing rod mounting system having a revolving lock capable of releasably securing a fishing rod, with the revolving lock returning to its closed position when not engaged by the user.

BACKGROUND OF THE INVENTION

Fishing rod holders are used in recreation and sport fishing to hold fishing rods and associated fishing reels in a preselected position, often allowing hands free use of the fishing rod/reel combination. Some such fishing rod holders allow the user to adjust the position of the fishing rod relative to a horizontal plane, thereby changing the angle formed between the fishing rod and the horizontal plane.

Other fishing rod holders are formed from a plate secured to a side of boat by screws and provided at the upper side with a cylindrical sleeve that is the real holder and supports the handle of the fishing rod keeping it in the right fishing position. Among such fishing rod holders, there are fixed holders, i.e. not removable from the installation site, and there are fixed or removable holders provided with fishing rod position adjustment means. In either case, all of the known fishing rod holders have several problems, generally due to the cumbersome size of the holders and the difficulty in both securing and easily releasing the fishing rod from the holder.

SUMMARY OF THE INVENTION

The present invention eliminates the above-mentioned needs for fishing rod holder by providing a revolving lock rod storage holder for use as a boating accessory that is capable of rotational movement to easily secure and release a fishing rod.

In accordance with the present invention, there is provided a revolving lock rod storage holder including a revolving lock having a first spring cavity and a first spring anchor member, a revolving lock body operatively engaged to the revolving lock, the revolving lock body having a second spring cavity and a second spring anchor member, and a spring operatively engaged to the first spring attachment anchor and the second spring anchor member, at least a portion of the spring positioned in the first spring cavity and the second spring cavity.

The present invention is further directed towards a revolving lock rod storage holder assembly including: (a) a revolving lock rod storage holder for releasably supporting a shaft of a fishing rod, including, a revolving lock having a first spring cavity and a first spring anchor member, a revolving lock body operatively engaged to the revolving lock, the revolving lock body having a second spring cavity and a second spring anchor member, and a spring operatively engaged to the first spring anchor member and the second spring anchor member, at least a portion of the spring positioned in the first spring cavity and the second spring cavity, and (b) a fixed rod storage hold for supporting a supported end of the fishing rod.

BRIEF DESCRIPTION OF THE DRAWINGS

FIG. 5 is an isometric view of the preferred embodiment of the present invention FIG. 1a.

DETAILED DESCRIPTION OF THE PRESENT INVENTION

Figure 1A:
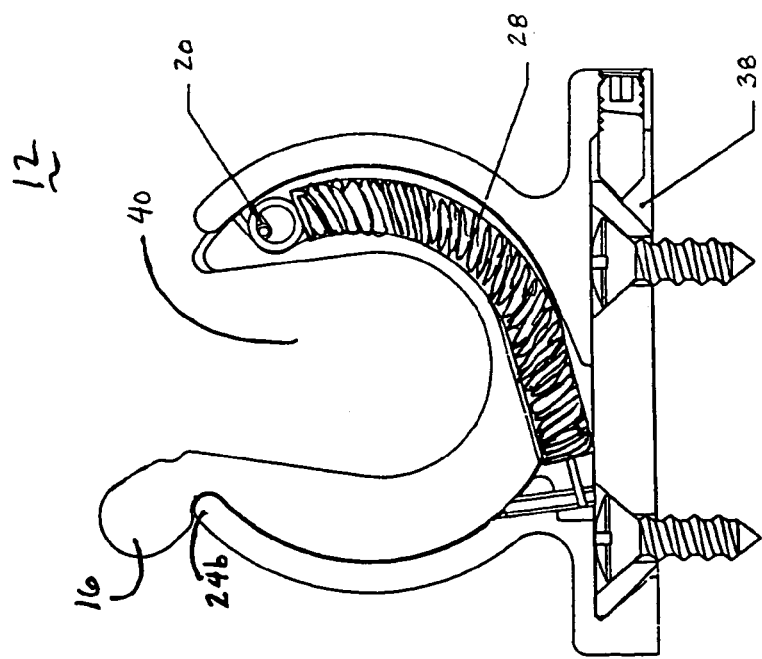
FIG. 1a is a sectioned side view illustration of the preferred embodiment of the present invention in a first position.

Referring now to FIG. 1a, the preferred embodiment of the present invention is illustrated as revolving lock rod storage holder 12. Revolving lock rod storage holder 12 includes revolving lock 14 and revolving lock body 22.

As is illustrated in FIG. 1a, revolving lock 14 incorporates a revolving lock tab 16. Revolving lock tab 16 is preferably formed out of the material that forms revolving lock 14. Revolving lock tab 16 permits the user to engage revolving lock 14. Revolving lock 14 further incorporates a first spring cavity 18, which provides a space to accommodate spring 28 (as discussed in detail below). Spring 28 is engaged to revolving lock 14 by an first anchor pin 20 by way of spring hook 29a.

Figure 2:
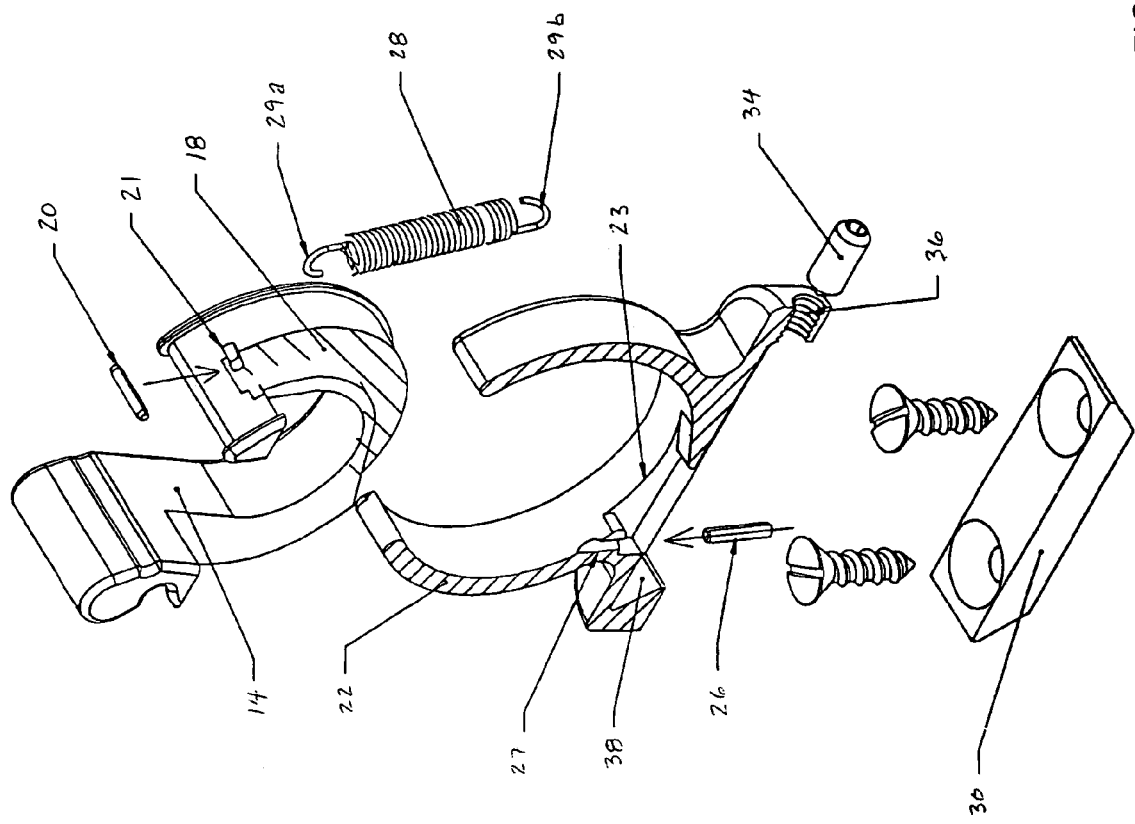
FIG. 2 is an exploded partially sectioned isometric view of the preferred embodiment of the present invention of FIG. 1b.
Figure 5:
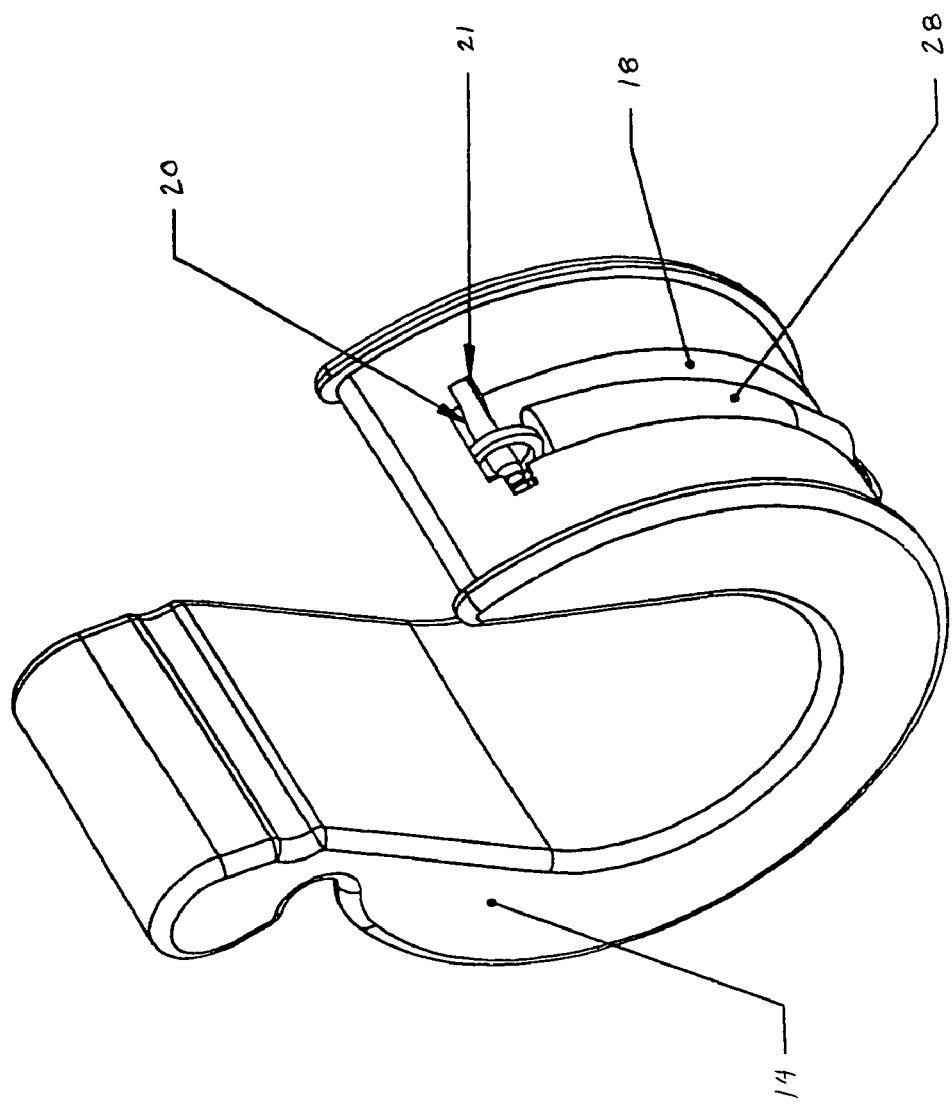

As is further illustrated in FIGS. 2 and 5, an anchor pin bore 21 that is formed within revolving lock 14 accommodates first anchor pin 20.

Spring 28 is further engaged to revolving lock body 22 by a second anchor pin 26 by way of spring hook 29b. As is illustrated in FIG. 2, revolving lock body 22 incorporates an anchor pin bore 27 to accommodate second anchor pin 26. As a result of the engagement between spring 28, spring hook 29a, first anchor pin 20, spring hook 29b, and second anchor pin 26, revolving lock 14 and revolving lock body 22 engage one another. The engagement of revolving lock 14 and revolving lock body 22 results in an alignment of first spring cavity 18 (of revolving lock 14) and second spring cavity 23 (revolving lock body 22).

The alignment of first spring cavity 18 and second spring cavity 23 permits spring 28 to pass through both first spring cavity 18 and second spring cavity 23 and engage revolving lock 14 and revolving lock body 22 at first anchor pin 20 and second anchor pin 26, respectively. Preferably, the resting state of the engagement between revolving lock 14 and revolving lock body 22 results in a first position, such as, for example, a "closed" position (as illustrated in FIG. 1a).

The tension present in the resting state of spring 28 results in a pull on first anchor pin 20 and second anchor pin 26. The pull on first anchor pin 20 causes revolving lock 14 to rotate within its engagement to revolving lock body 22 in the direction of second anchor pin 26. Preferably, the rotation of revolving lock 14 terminates prior to a complete return to a resting state of spring 28. The rotation of revolving lock 14 in the direction of second anchor pin 26 is halted by a first tab stop 24a, which is formed from revolving lock body 22.

Additionally, revolving lock body 22 mounts to a substrate (as further discussed below with reference to FIG. 3) by way of a wedge block 30. Wedge block 30 accommodates fasteners 32, which affix wedge block 30 to a substrate. As is illustrated in FIG. 1a, wedge block 30 is preferably in an abutting relationship with revolving lock body 22 at shoulder 37. The opposing end of wedge block 30 is secured to revolving lock body 22 by a wedge screw 34. Wedge screw 34 preferably passes through a threaded bore 36 of revolving lock body 22 and into wedge block cavity 38. Wedge screw 34 is preferably passed through threaded bore 36 to a point that abuts wedge block 30 and prevents wedge block 30 from disengaging from revolving lock body 22.

Figure 1B:
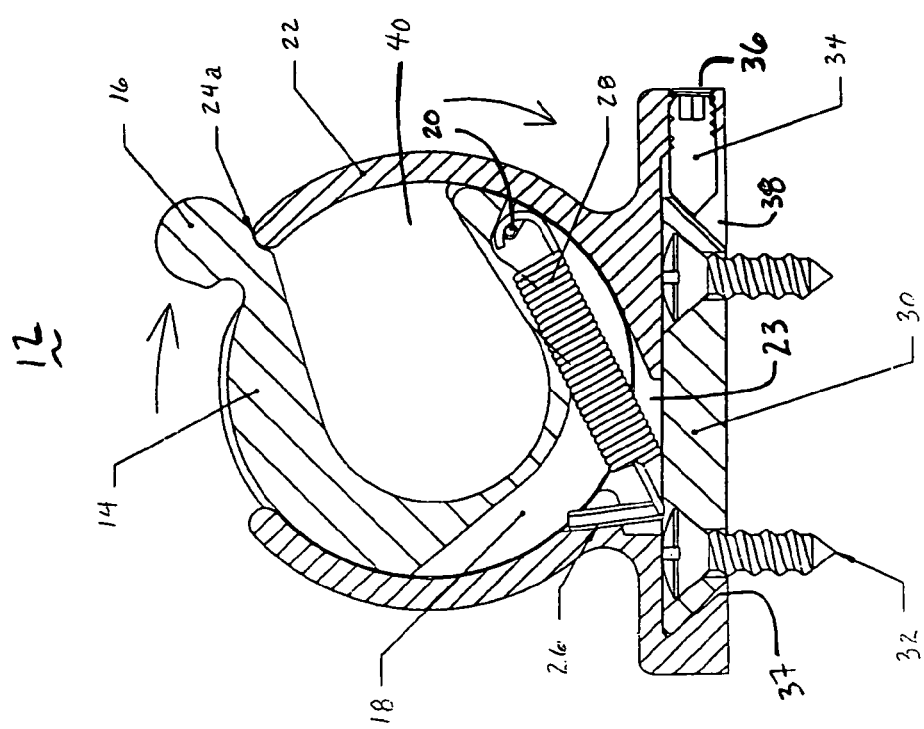
FIG. 1b is a sectioned side view illustration of the preferred embodiment of the present invention of FIG. 1a in a second position.

Referring now to FIG. 1b, revolving lock rod storage holder 12 is illustrated with revolving lock tab 16 engaged and placed in a non-resting position. Preferably, the non-resting state of the engagement between revolving lock 14 and revolving lock body 22 results in a second position, such as, for example, an "open" position (as illustrated in FIG. 1b).

As is further shown in FIG. 1b, the application of a stretching force against spring 28 by way of revolving tab lock 16 results in a stretching of spring 28 and a pull on first anchor pin 20, causing revolving lock 14 to rotate within its engagement to revolving lock body 22 in a direction away from second anchor pin 26. Preferably, the rotation of revolving lock 14 terminates prior to a complete return to a resting state of spring 28. The rotation of revolving lock 14 in the direction away from second anchor pin 26 is halted by a second tab stop 24b, which is also formed from revolving lock body 22.

Figure 3:
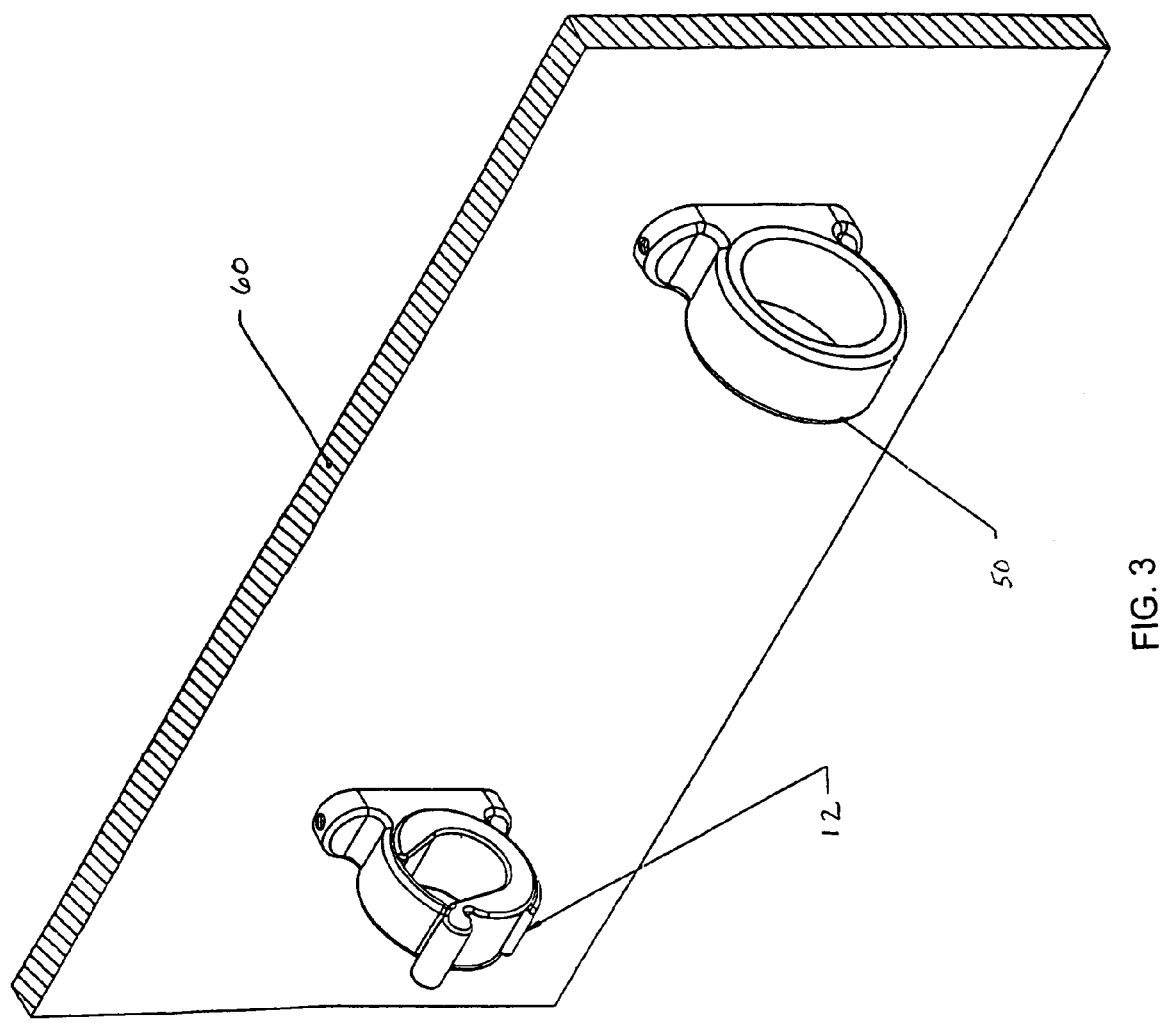
FIG. 3 is an isometric view of the preferred embodiment of the present invention of FIG. 1a mounted to a substrate.

Referring now to FIG. 3, revolving lock rod storage holder 12 is illustrated mounted to mounting surface 60. Mounting surface 60 can be any adequate substrate, including, but not limited to boat surfaces (vertical or horizontal), accessory mounting plates, or the like. As shown in FIG. 3, revolving lock rod storage holder 12 is aligned with a fixed rod storage holder 50. Fixed rod storage holder 50 is utilized to support an end of an object, such as a fishing rod, as detailed below with reference to FIGS. 4a and 4b.

Figure 4A:
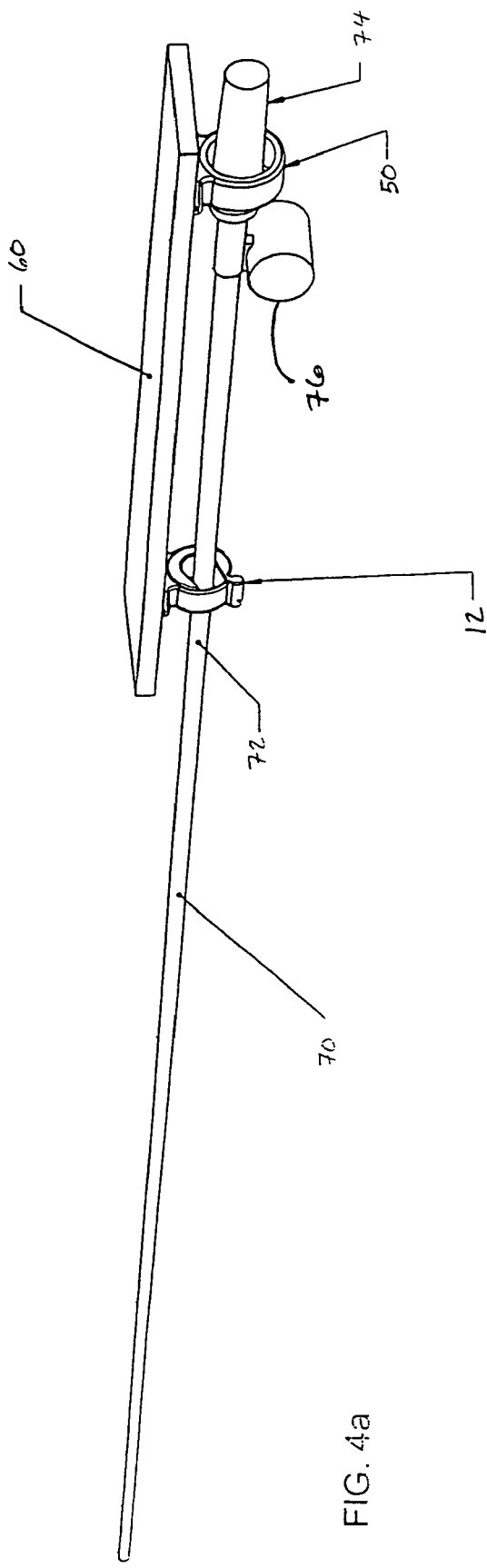
FIG. 4a is an isometric view of the preferred embodiment of the present invention FIG. 1a in operation.
Figure 4B:
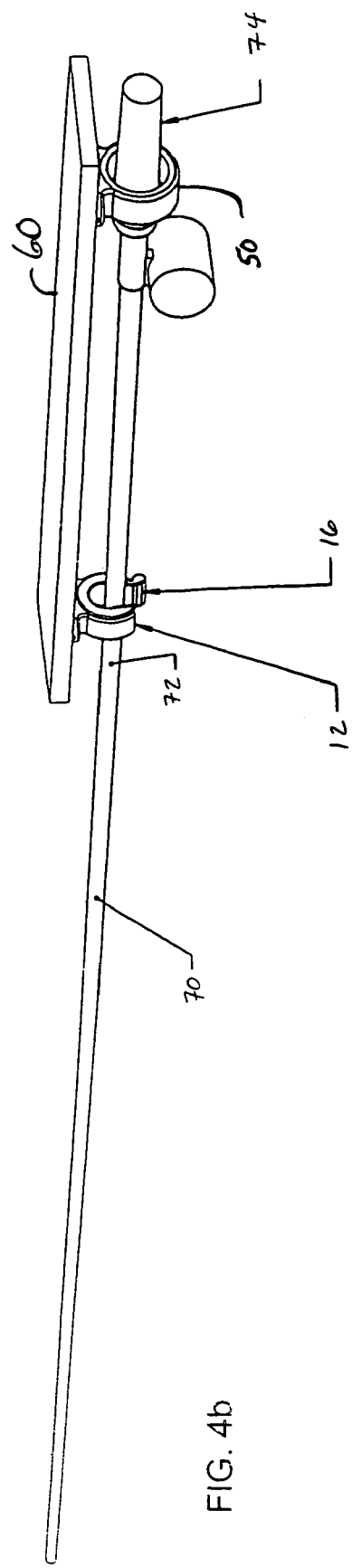
FIG. 4b is an isometric view of the preferred embodiment of the present invention FIG. 1a in operation

Referring now to FIGS. 4a and 4b, fixed rod storage holder 50 accommodates a supported end 74 of a fishing rod 70, or similar object. Preferably, a shaft 72 of fishing rod 70 is supported by revolving lock rod storage holder 12 when revolving lock rod storage holder 12 is in a first position, as detailed above. The positioning of reel 76 between revolving lock rod storage holder 12 and fixed rod storage holder 50 eliminates the possibility of rod 70 from sliding out of both revolving lock rod storage holder 12 and fixed rod storage holder 50.

As is shown in FIG. 4a, rod 70 is in a supported position that is in a plane substantially parallel to the plane occupied by mounting surface 60 when revolving lock rod storage holder 12 is in a first, i.e. "closed," position. As is illustrated in FIG. 4b, rod 70 can be removed from revolving lock rod storage holder 12 along shaft 72 when revolving lock tab 16 of revolving lock rod storage holder 12 is placed in a second, i.e. "open," position. Once revolving lock tab 16 is in the second position the user can pull out rod 70 at shaft 72 and remove rod 70 by sliding supported end 74 out of fixed rod storage holder 50.

Although only a few exemplary embodiments of the present invention have been described in detail above and in the following Figures, those skilled in the art will readily appreciate that numerous modifications to the exemplary embodiments are possible without materially departing from the novel teachings and advantages of this invention. Accordingly, all such modifications are intended to be included within the scope of this invention as defined in the following claims.

What is claimed is:

1. A revolving lock rod storage holder, comprising:
   a revolving lock having a first spring cavity and a first spring anchor member;
   a revolving lock body operatively engaged to said revolving lock, said revolving lock body having a second spring cavity and a second spring anchor member; and
   a spring operatively engaged to said first spring anchor member and said second spring anchor member, at least a portion of said spring positioned in said first spring cavity and said second spring cavity.

2. The revolving lock rod storage holder according to claim 1 wherein said revolving lock includes a revolving lock tab.

3. The revolving lock rod storage holder according to claim 1 wherein said revolving lock tab abuts a first tab stop when said revolving lock tab is in a first position.

4. The revolving lock rod storage holder according to claim 1 wherein said revolving lock tab abuts a second tab stop when said revolving lock tab is in a second position.

5. The revolving lock rod storage holder according to claim 1 wherein said revolving lock body is mounted to a wedge block.

6. The revolving lock rod storage holder according to claim 5 wherein said wedge block is secured to said revolving lock body by a wedge screw.

7. The revolving lock rod storage holder according to claim 6 wherein said wedge screw engages said revolving lock body through a threaded bore.

8. The revolving lock rod storage holder according to claim 7 wherein said wedge block is releasably mounted to a mounting surface.

9. A revolving lock rod storage assembly, comprising:
   (a) a revolving lock rod storage holder for releasably supporting a shaft of a fishing rod, comprising:
      a revolving lock having a first spring cavity and a first spring anchor member;
      a revolving lock body operatively engaged to said revolving lock, said revolving lock body having a second spring cavity and a second spring anchor member; and
      a spring operatively engaged to said first spring anchor member and said second spring anchor member, at least a portion of said spring positioned in said first spring cavity and said second spring cavity; and
   (b) a fixed rod storage holder for supporting an end of said fishing rod.

* * * * *